April 5, 1932.    H. A. HARRISON    1,852,518
SAW FILING OR SHARPENING DEVICE
Filed April 30, 1930    5 Sheets-Sheet 2

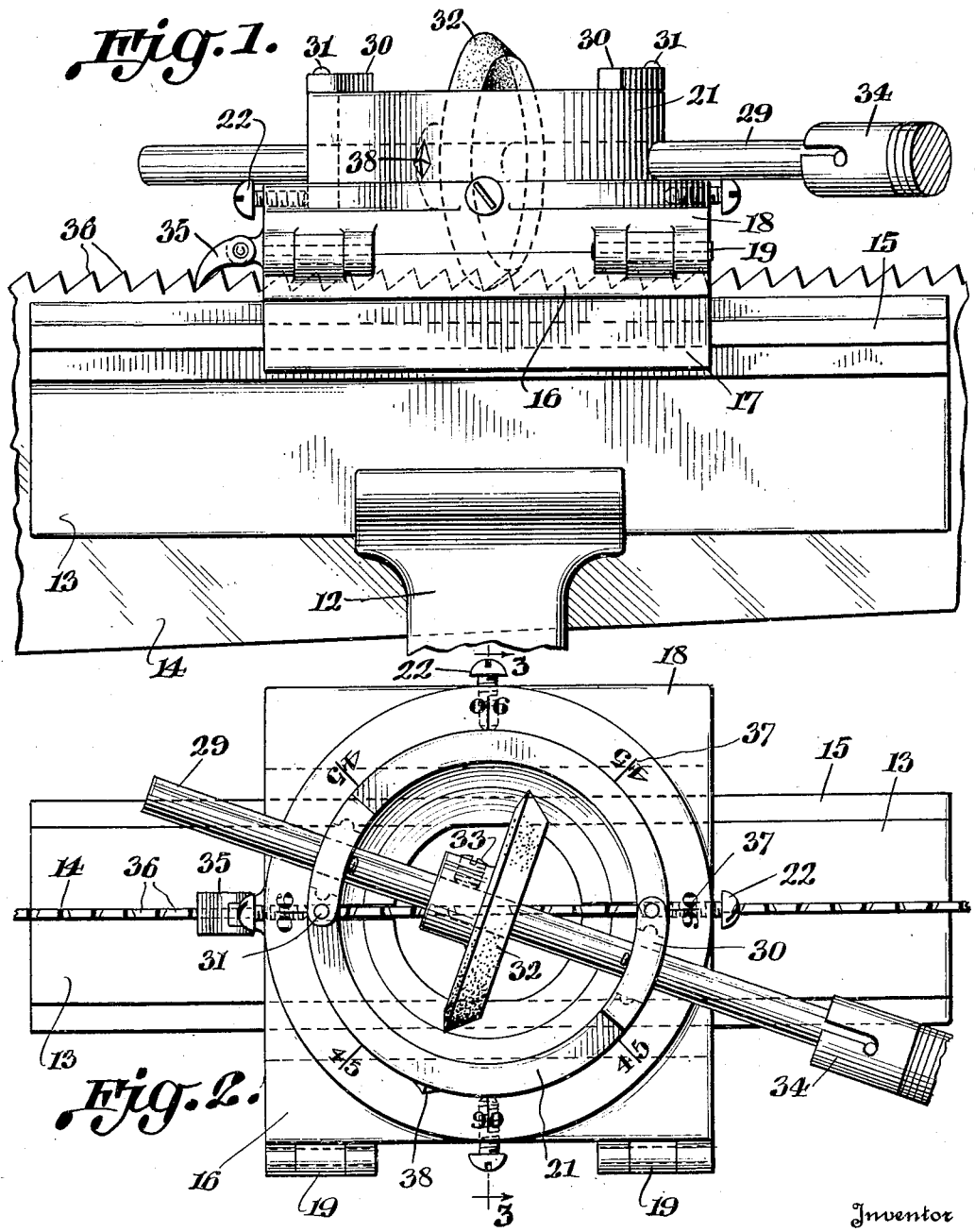

Inventor
Henry A. Harrison
By
Attorney

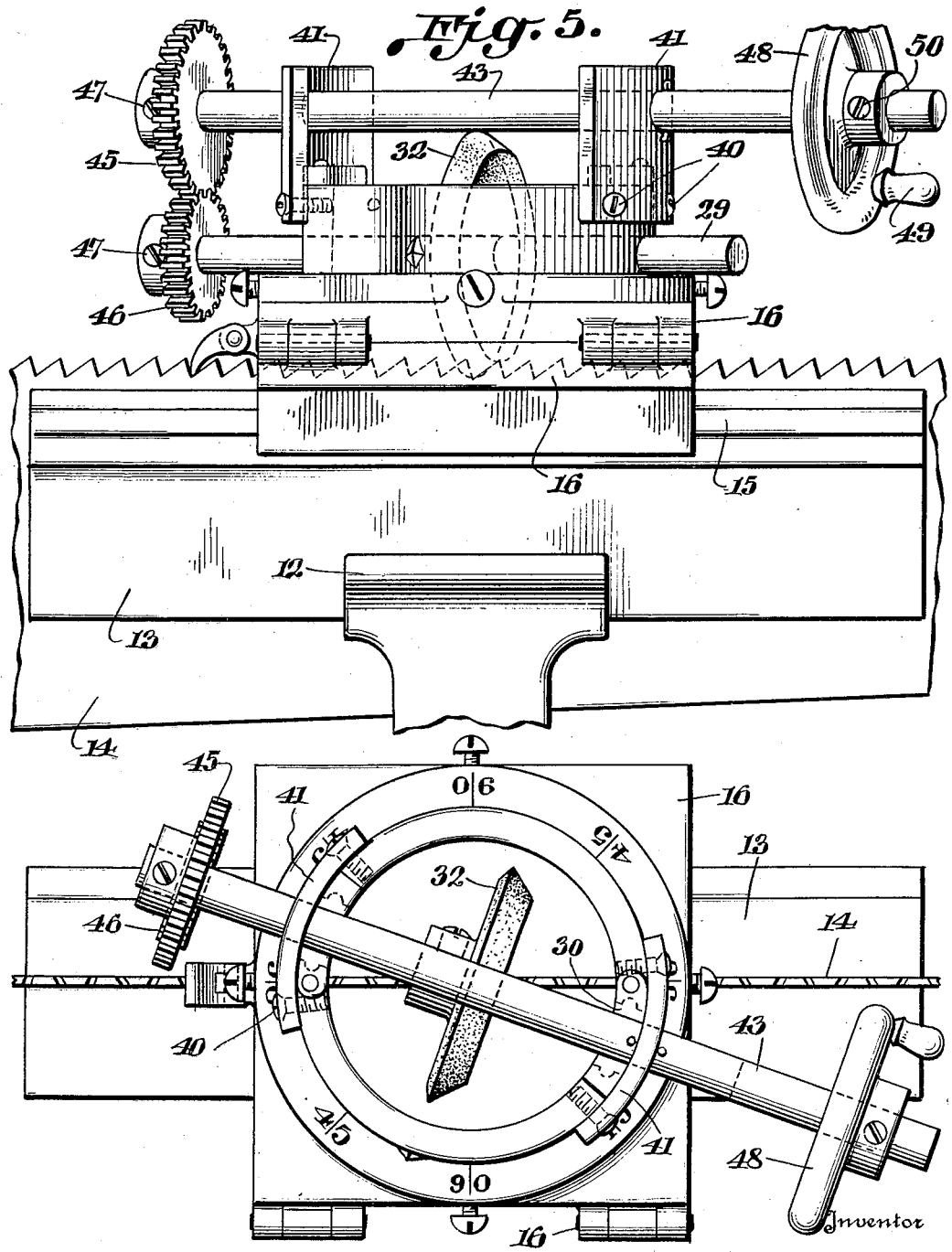

April 5, 1932.   H. A. HARRISON   1,852,518
SAW FILING OR SHARPENING DEVICE
Filed April 30, 1930   5 Sheets-Sheet 4
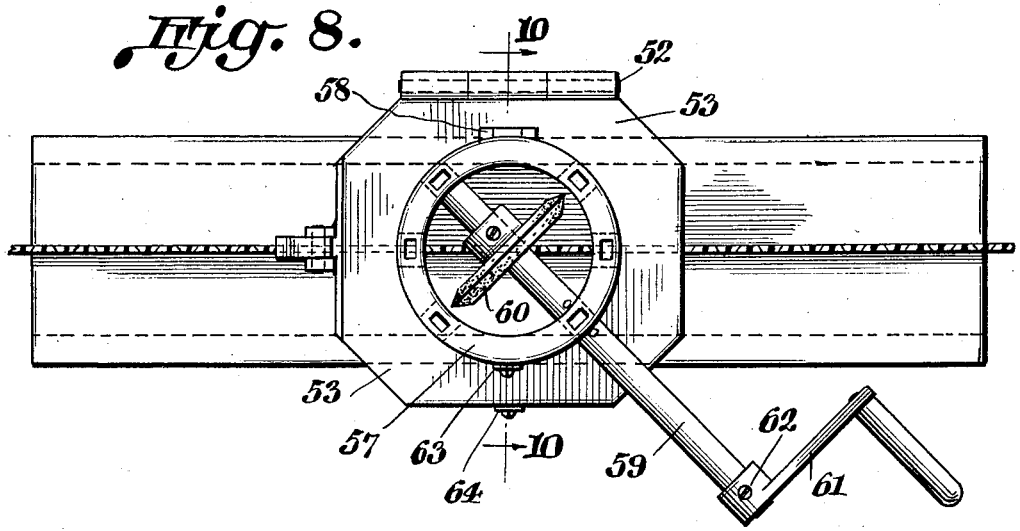
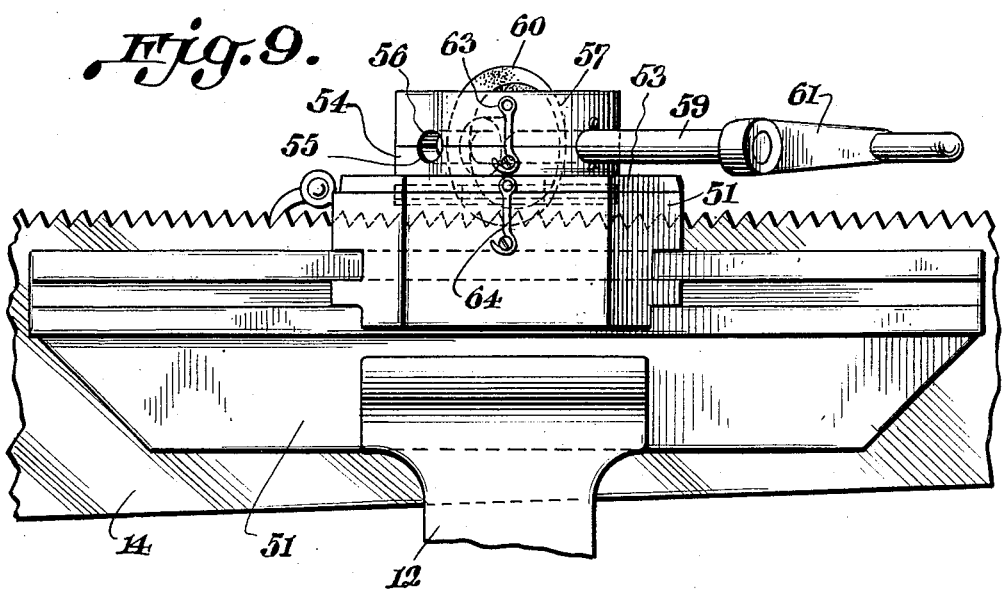

April 5, 1932. H. A. HARRISON 1,852,518
SAW FILING OR SHARPENING DEVICE
Filed April 30, 1930 5 Sheets-Sheet 5

Inventor
Henry A. Harrison
By
Attorney

Patented Apr. 5, 1932

1,852,518

UNITED STATES PATENT OFFICE

HENRY A. HARRISON, OF JAMESTOWN, NORTH DAKOTA, ASSIGNOR OF ONE-HALF TO ROBERT H. HARRISON, OF NEW BRUNSWICK, NEW JERSEY

SAW FILING OR SHARPENING DEVICE

Application filed April 30, 1930. Serial No. 448,695.

This invention relates to improvements in saw filing or sharpening devices, and more particularly to novel filing mechanism of the rotary type.

One of the objects of the invention is to provide a filing device which may be used with the ordinary bench-type clamp, the latter being employed to hold guides which clamp the saw against movement, and the guides functioning as tracks for the carriage of the filing mechanism.

Another object is to furnish a saw filing device of the rotary type, in which a number of filers may be interchangeably used with a common driving shaft, so that the device may be employed to sharpen saws having teeth of different designs.

A further object is to provide a saw filing mechanism including a sliding carriage which permits the filing wheel shaft to be arranged at various angles relatively to the plane of the saw blade, to take care of saw teeth of various angles.

Another object is to provide a mechanism of this character, including indicating means to aid the operator in setting the plane of the filing wheel at the proper angle relatively to the plane of the blade.

Another object is to furnish a saw filing device comprising tracks which are clamped to the saw blade, a carriage movably mounted on said tracks, and a stop pawl for use in properly positioning the filing wheel in proper relation relatively to the teeth of the saw.

Another object is to provide a mechanism of this type, in which the upper portion of the carriage is hingedly mounted to facilitate movement of the carriage along the saw teeth.

A still further object is to provide such a filer with means to allow the filer driving shaft to be detached for the purpose of changing the filing wheel.

Another object is to furnish a saw filing mechanism of the rotary wheel type, in which the wheel driving shaft may be driven by a suitable motor or by an auxiliary hand actuated mechanism.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is an elevation of a preferred form of the invention, in which the filing wheel shaft is motor actuated.

Fig. 2 is a top plan view of the same.

Fig. 5 is a view similar to Fig. 1, of a second form of the invention, in which an auxiliary hand drive is substituted for the motor drive.

Fig. 6 is a top plan view of the structure shown in Fig. 5.

Fig. 8 is a plan view of a modification.

Fig. 9 is an elevation of the same.

Figure 3:
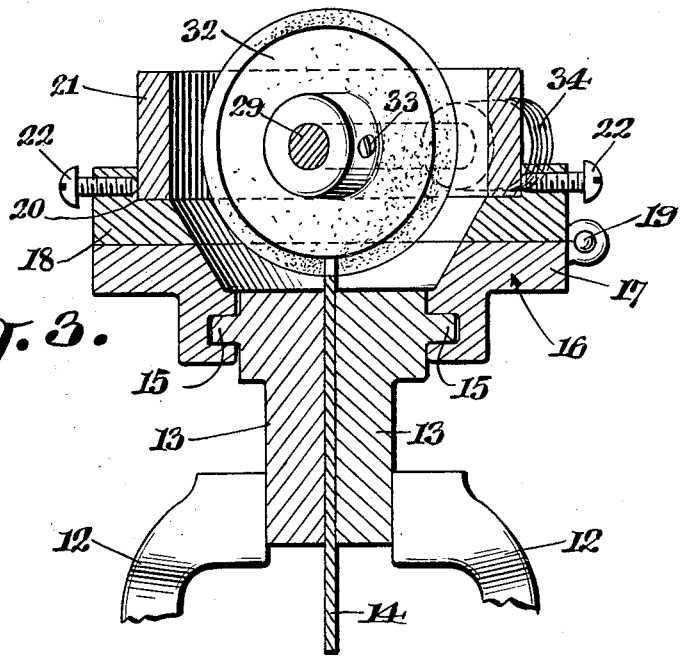
Fig. 3 is a vertical section on the line 3—3 of Fig. 2.

In the embodiment of the invention illustrated in Figs. 1 to 4 inclusive, 12 designates the arms or jaws of an ordinary bench clamp, which may engage or be secured to horizontally elongated jaws 13 which clamp a saw blade 14 in position to be ground, and are provided with horizontal guideways 15. A carriage 16 is slidably mounted on these guideways, and includes a base 17 to which a cover ring 18 is hinged, as shown at 19. The cover ring is provided at its upper end with an annular rabbet 20 which functions as a guide for a turret 21, the latter being adjustably secured to the cover ring by any suitable means, such as screws 22, so as to allow the turret to be turned about its vertical axis.

Figure 4:
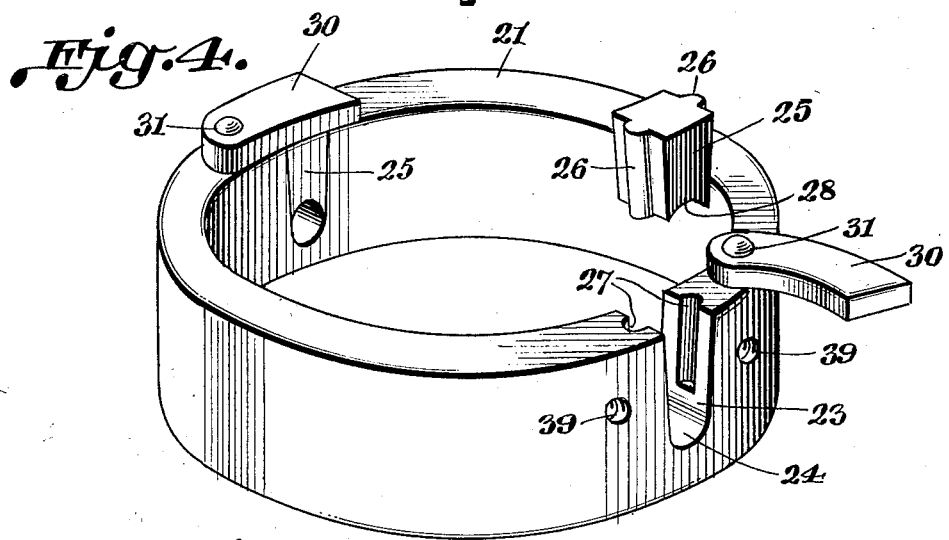
Fig. 4 is a detail perspective view of a turret forming part of the preferred form.

As best shown in Fig. 4, the turret is provided at diametrically opposite points with U-shaped notches 23, cut downwardly from its upper edge, the lower ends of the notches, as shown at 24, being of semi-cylindrical shape. The upper portions of these notches are closed by removable blocks or wedges 25, and each block has ribs 26 at its opposite sides which slidably engage vertical grooves 27 that are formed in the turret and merge into the notch. The lower end of each block has a semi-cylindrical surface 28 which, with the surface 24, forms a cylindrical bore that functions as a bearing for the filer shaft 29. When the blocks 25 are removed, the filer shaft can be introduced into the notches or removed from the same, and when the shaft occupies the notches, the blocks rest on the shaft and are held downwardly by latches 30 which are pivotally mounted at 31 on the upper edge of the turret.

A filer wheel 32 of any suitable profile is detachably mounted on the shaft and locked to the latter by any suitable means such as a screw 33.

At this point it may be well to note that the construction just described permits the filing wheel to be readily placed or removed from the shaft, and it is my intention to employ a set of filing wheels which are interchangeable, whereby the machine can be used to file saw teeth of various configurations.

In this form of the invention, the shaft may be driven by any suitable prime mover, through the instrumentality of a flexible shaft 34.

A pawl 35 is pivotally mounted at one end of the carriage to cooperate with the teeth 36 of the saw blade, and it will be appreciated that the pawl, when occupying a groove between two of the saw teeth will act to hold the edge of the filing wheel in proper relation to the tooth that is to be ground. For example, in Fig. 1, the pawl is holding the carriage in a certain position to file a particular tooth, and after that tooth has been filed, the cap ring 18 and turret 21 are swung upwardly on the hinges 19 to allow the wheel to clear the teeth, and then the carriage is shifted toward the right until the pawl drops in the next notch. Now, when the cap ring and turret are swung downwardly to their original positions, the edge of the filing wheel comes into contact with the next tooth that is to be ground.

It is preferred to place indicating marks 37 on the upper edge of the cap ring, and these will cooperate with a pointer 38 on the outer side of the turret to enable the operator to set the turret in the desired position in which the edge of the filing wheel will properly cooperate with the particular teeth of the saw that is being sharpened.

It will be understood that any suitable means, not shown, may be employed to prevent axial movement of the shaft in the turret during rotation of said shaft.

Figure 7:
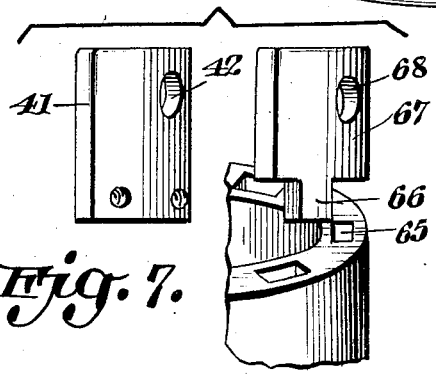
Fig. 7 shows perspective views of suitable detachable bearings which may be used when the hand drive is substituted for the motor drive.

In order that the filing wheel shaft may be driven by hand through the medium of reduction gearing, the turret is provided with screw threaded holes 39; a pair of these holes being arranged adjacent to each of the notches 33, and each pair being adapted to receive screws 40 which pass through an auxiliary bearing plate 41, a detail of which is shown in Fig. 7. Each of these bearing plates has a bearing bore 42, and these bores receive a hand driven shaft 43. Meshing gears 45, 46 are detachably mounted on the shafts, and may be secured in position, for example, by screws 47, and one end of the hand shaft 43 is provided with a hand flywheel 48 having a handle 49. The wheel 48 may be secured to the shaft by means of a screw 50. As the gear 45 and wheel 48 are detachably mounted on the shaft 43, it is obvious that this shaft may be removed from the bearing 41 whenever desired, and of course, in actual practice, some means, not shown, will be employed to prevent axial movement of the shaft 43, so that the gears 45 and 46 will remain in mesh.

With this form of the invention, when the upper portion of the carriage is swung upwardly on the hinges, of course, both shafts will rise with the same.

Figure 10:
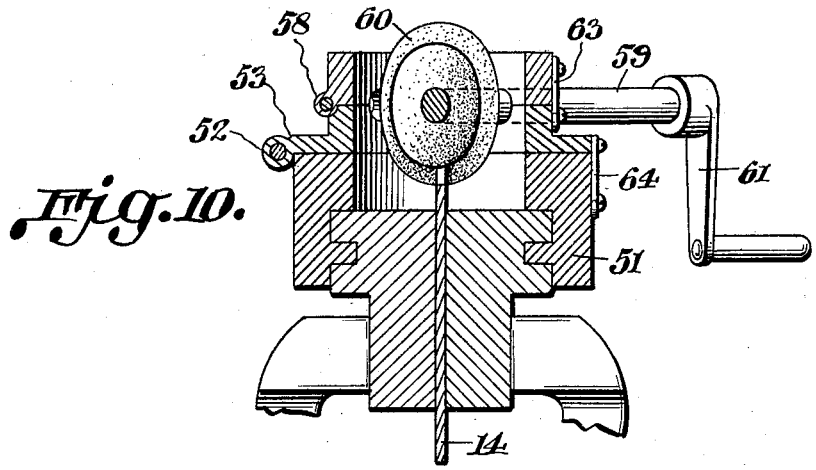
Fig. 10 is a vertical sectional view on the line 10—10 of Fig. 8.

In Figs. 8, 9 and 10, I have disclosed a construction in which the filing wheel shaft is directly driven by a hand crank secured to that shaft, but the structure is modified to allow the angle of the shaft to be varied relatively to the plane of the tracks. For example, the slidable carriage base 51 is hinged at 52 to a cover 53. The latter has an upstanding circular flange 54 provided at a number of diametrically opposite points, with semicircular notches 55 which cooperate with similar notches 56 in the lower edge of a ring 57 that is hingedly mounted on the cover, as shown at 58. These cooperating notches form bearings for the filing wheel shaft 59, and it will be understood that the shaft may be mounted in any diametrically opposite pair of the bearings; and as these bearings are arranged at different angles relatively to the carriage guides, obviously, the plane of the filing wheel 60 may be arranged at a suitable angle to accommodate the teeth of a particular saw.

In this form of the invention, I also mount the filing wheel on the shaft in a detachable manner, so that such filing wheels may be interchanged. A hand crank 61 is detachably secured to the shaft by means of a screw 62.

Suitable latch hooks 63 and 64 are used respectively to secure the ring 57 to the cap flange 54, and the cap 53 to the base of the carriage. It will be understood that when the hook 64 is released, the cap, ring 57 and the filing wheel may be swung upwardly to clear the saw teeth, as the carriage is shifted from one tooth to the next.

Figure 11:
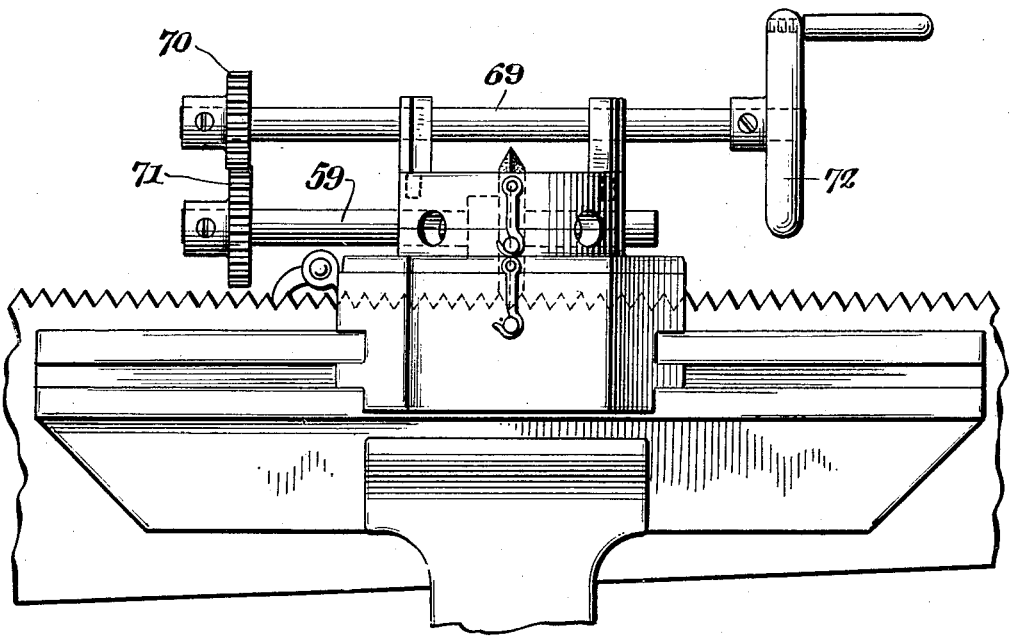
Fig. 11 is an elevation of the structure shown in Figs. 8 to 10 inclusive, but with the filing wheel shaft driven through the medium of speed reduction gearing.

The embodiment of the invention shown in Figs. 8 to 10 inclusive may also be used with an auxiliary hand driving mechanism, including reduction gearing. For example, the ring 67 may be provided at its upper edge, (see Fig. 7), with sockets 65 which register with the notches 56 and are adapted to receive tenons 66 depending from auxiliary bearing posts 67 which have bearing apertures 68. As shown in Fig. 11, a pair of these bearing posts may be used with a diametrically opposite pair of the sockets 65 that are arranged directly above the shaft 59, and these posts rotatably support an auxiliary shaft 69 which cooperates by means of meshing gears 70 and 71 with the shaft 59. A hand wheel 72 that is mounted on the shaft 69, is then employed to drive the filing wheel through the intermediary of the reduction gearing.

With this construction, it will be understood that whenever the angularity of the shaft 59 is changed relatively to the plane of the saw blade by shifting the shaft 59 to the proper ones of the notches 55, 56, that the shaft 69 can be brought into parallel relation with the shaft 59 by causing the tenons of the posts 67 to engage proper ones of the sockets 65.

Any suitable means such as set screws, not shown, may be used to lock the tenons 66 in their sockets.

While I have disclosed what I now consider preferred embodiments of the invention in such manner that the construction, operation and advantages thereof may be understood by those skilled in the art, I am aware that changes may be made in the details disclosed, without departing from the spirit of the invention, as expressed in the claims.

What I claim and desire to secure by Letters Patent is:

1. A saw-filing machine, comprising oppositely disposed jaws for clamping a saw-blade, a carriage slidably mounted on said jaws and including a base and a ring hingedly mounted on the base, a turret rotatably mounted on said ring, a shaft journaled in diametrically disposed bearings in the turret wall, a filing-wheel carried by said shaft and positioned to pass through the carriage-base and the surmounted ring to engage teeth of a saw blade held by the clamping jaws, and means securing the turret at points of circular adjustment for alinement of the filing wheel and saw teeth.

2. A saw-filing machine, comprising oppositely disposed jaws for clamping a saw-blade, a carriage slidably mounted on said jaws and including a base and a ring hingedly mounted on the base, said ring having a rabbeted top face, a turret rotatably seated in the rabbeted face of said ring, means for securing the turret in circular adjustment on said ring, a shaft journaled in diametrically disposed bearings in the turret, a filing-wheel carried by said shaft and positioned to pass through the ring surmounted on the carriage to engage teeth of a saw-blade held by the clamping jaws, the hinge connection with the carriage-base of the ring to which the turret it attached permitting the ring, the turret and the filing-wheel shaft to be swung away from the saw-blade.

3. A saw-filing machine, comprising oppositely disposed jaws for clamping a saw-blade, a carriage slidably mounted on said jaws and including a base and a ring hingedly mounted on the base, a turret rotatably mounted on said ring, a rotatable shaft provided with a saw-blade filing wheel disposed in position to engage teeth of a saw-blade, said shaft being rotatably seated in bearings formed at diametrically opposite points in the turret-wall, and means for releasably connecting the turret with the ring on which it is mounted.

4. A saw-filing machine, comprising oppositely disposed jaws for clamping a saw-blade, a carriage slidably mounted on said jaws and including a base and a ring hingedly mounted on the base, a turret seated on the ring, means for securing the turret on the ring, a filing-wheel carrying shaft rotatably mounted in bearings disposed at diametrically opposite points in the turret wall, auxiliary bearing-plates attached to and extending above the turret wall, an auxiliary manually operated shaft journalled in said auxiliary bearing-plates, and reducing gears operatively connecting the two shafts for manual operation of the filing-wheel carrying shaft, both shafts and the filing-wheel swinging away from the saw-blade when the ring hinged to the carriage base is swung away from the base.

In testimony whereof I affix my signature.

HENRY A. HARRISON.